July 27, 1926.

E. F. REMUS

BRAKE

Filed Oct. 13, 1924 2 Sheets-Sheet 1

1,593,881

Inventor
E. F. Remus
By C. N. Parker
Attorney

July 27, 1926. 1,593,881
E. F. REMUS
BRAKE
Filed Oct. 13, 1924    2 Sheets-Sheet 2

Inventor
E. F. Remus

Patented July 27, 1926.

1,593,881

UNITED STATES PATENT OFFICE.

EDWARD FRANK REMUS, OF GRANITE CITY, ILLINOIS.

BRAKE.

Application filed October 13, 1924. Serial No. 743,425.

This invention relates to brakes and more particularly to front wheel brakes for motor vehicles.

An object of the invention is to provide a front wheel brake having a vertically movable operating member mounted in a spindle bolt to permit actuation of the brake and movement of the wheel about the spindle as a pivot in steering.

A further object is the provision of a front wheel brake that may be applied to any of the various types of front axles and wheels employed on different makes of motor vehicles.

Figure 1:
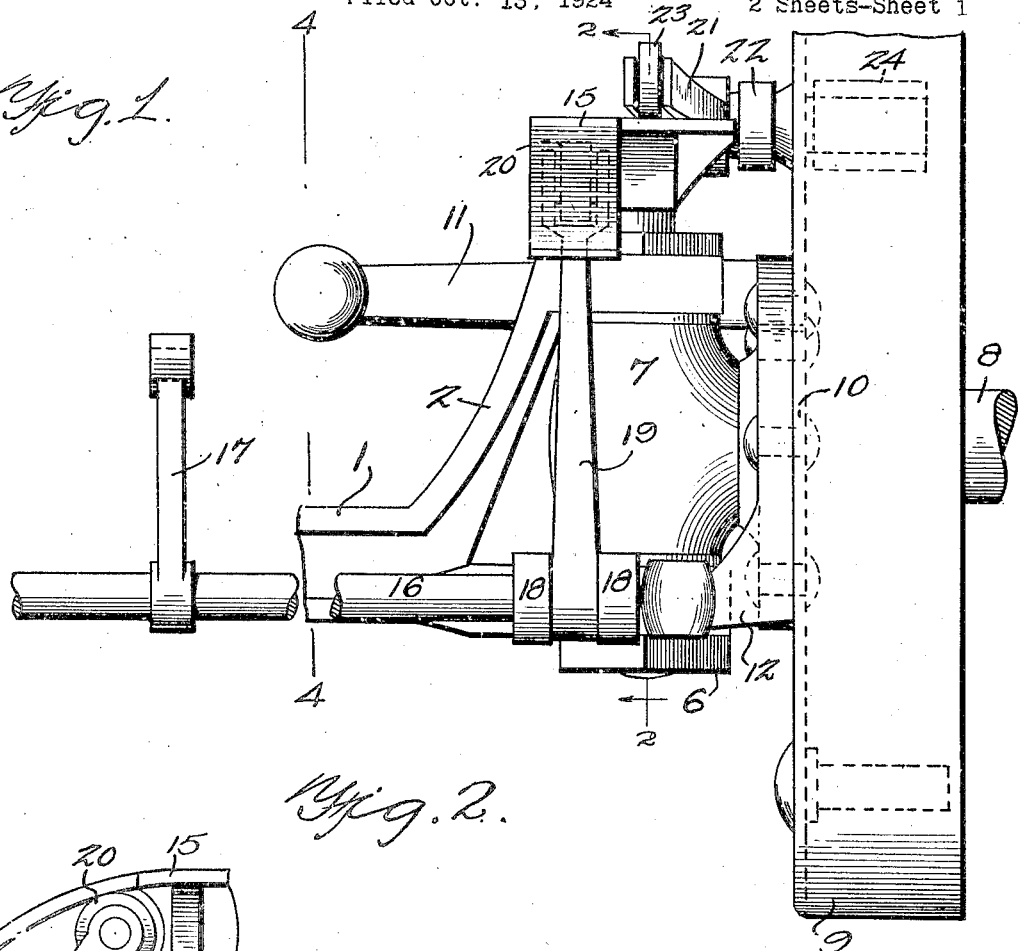
Figure 2:
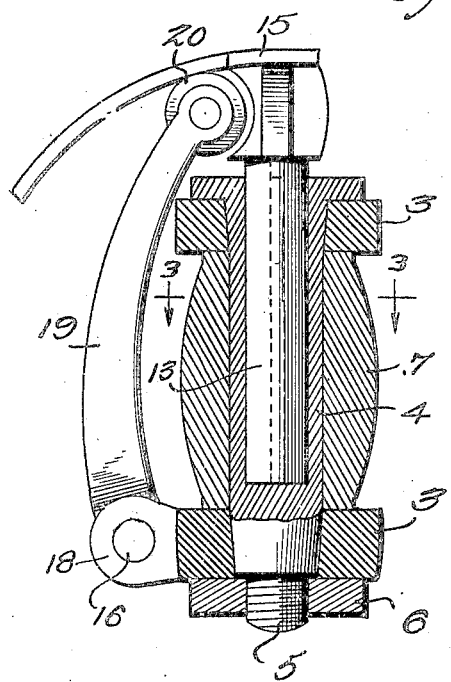
Figure 3:
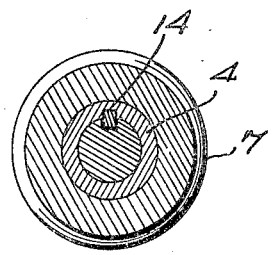
Figure 4:
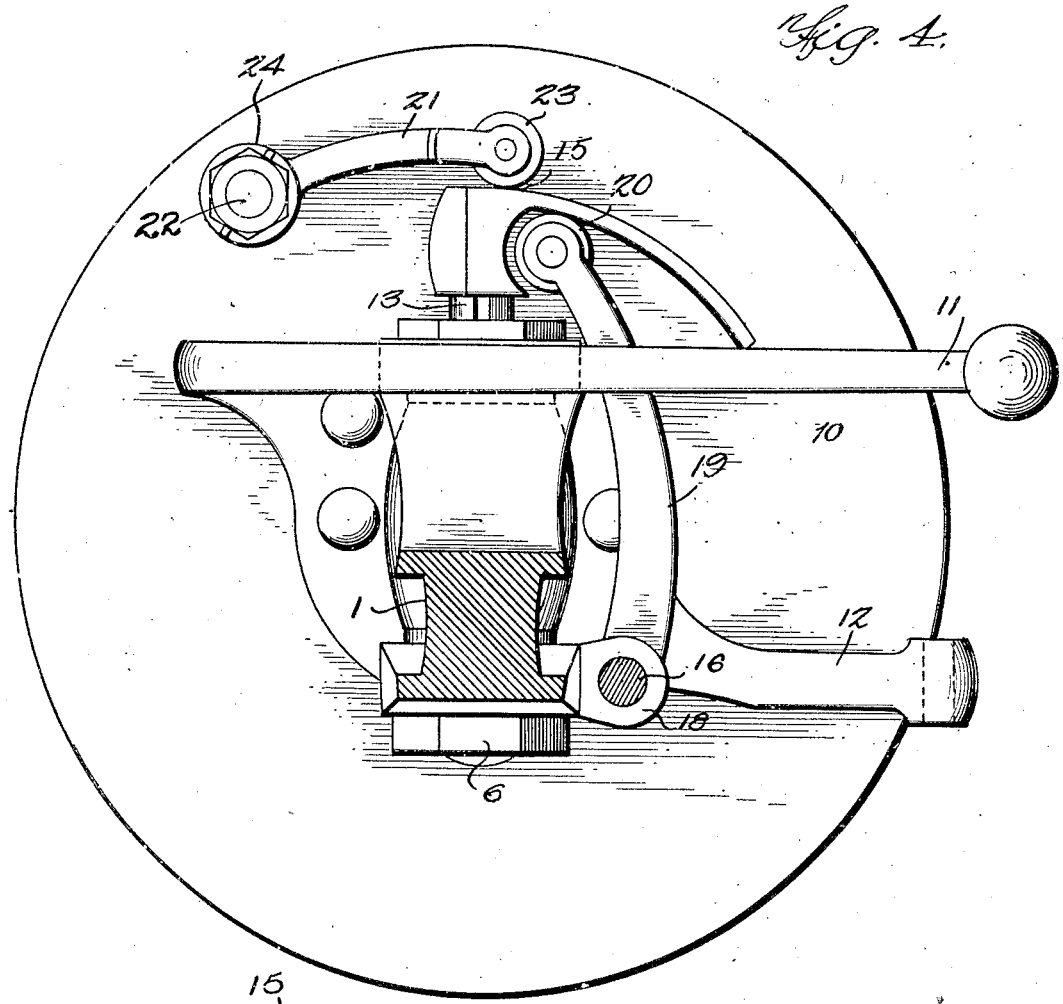
Figure 5:
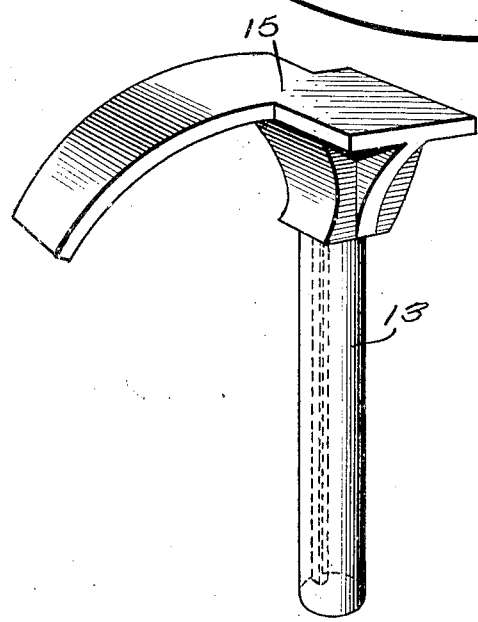

In the accompanying drawings, I have shown one embodiment of the invention. In this showing:

Figure 1 is a front elevation of a portion of the front axle of a motor vehicle showing the brake drum and the brake operating mechanism, Figure 2 is a vertical sectional view on line 2—2 of Figure 1, Figure 3 is a horizontal sectional view on line 3—3 of Figure 2, Figure 4 is a vertical sectional view on line 4—4 of Figure 1, and, Figure 5 is a perspective view of the vertically movable operating mechanism.

Referring to the drawings, the reference numeral 1 designates the front axle of a motor vehicle having a yoke 2 formed on each end. The yoke is provided with upper and lower parallel arms 3 of the usual construction. The spindle bolt 4 is mounted in the yoke and is provided with a reduced lower end which is threaded, as at 5, and adapted to receive a nut 6. A spindle 7 is mounted on the spindle bolt and is provided with the usual stub axle 8 for the reception of the front wheel.

A brake drum 9 is secured to the wheel (not shown) and contains the usual brake shoes (not shown). A disk 10 is attached to the spindle and an arm 11 is carried by this disk. This arm is adapted to be connected to the steering rod (not shown) extending from the steering post of the motor vehicle. The lower end of the disk is provided with a rearwardly extending arm 12 adapted to receive a tie rod (not shown) connected to the other wheel.

The spindle bolt 4 is hollow and is adapted to receive a vertically movable operating member 13. This member is provided with a groove for the reception of a key 14, carried by the spindle bolt to prevent relative rotation. A plate 15 is secured to the upper end of the operating lever or stem and this plate is provided with curved upper and lower faces, as shown. A brake operating rod 16 extends transversely of the vehicle, in the rear of the axle, and a crank or arm 17 is secured thereto and is adapted to be connected to the brake pedal (not shown) of the vehicle. The lower arm 3 of the yoke is provided with a pair of spaced parallel ears 18 having openings therein for the reception of the brake operating rod 16 and a lever 19 is arranged between these ears and keyed to the shaft 16 to revolve therewith. The upper end of this lever is provided with a roller 20 adapted to engage the lower face of the plate 15. An arm or lever 21 is pivoted to the outer face of the disk 10, the arm being mounted on a rock shaft 22 extending through the disk. The free end of this arm is provided with a roller 23 adapted to engage the upper face of the plate 15. Within the brake drum, the rock shaft 22 is provided with a cam 24 adapted to actuate the brake shoes.

In operation, the brake shaft 16 is rotated by actuating the brake pedal of the vehicle, swinging the lever 19 on its pivot. As the roller 20 rides on the under face of the plate 15, this plate and the stem 13 move upwardly. This upward movement causes the arm 21 to swing on its pivot due to the engagement of the roller 23 with the upper surface of the plate 15. When the lever 21 swings on its pivot, the cam 24 is turned to actuate the brake shoes.

It will be noted that the stem 13 is mounted in the spindle bolt and the rollers 20 and 23 are arranged at a point adjacent the center of the spindle bolt and spindle, which causes very little relative movement between the roller 20 and the plate 15 when the wheel turns on its pivot in steering. The relative movement of the parts of the brake operating mechanism carried by the axle and the parts carried by the wheel are thus permitted and the brake is capable of functioning at all times.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a vertically movable member mounted in the spindle bolt of the front wheel of a motor vehicle, an inclined plate mounted on the upper end of said member, a lever pivotally mounted on the axle and engaging the lower surface of said inclined plate, a brake drum mounted on the wheel, brake shoes arranged in said drum, a disk carried by the spindle and arranged adjacent the open side of said drum, a rock shaft rotatably mounted in said disk, a lever carried by said shaft and operatively connected to the upper surface of said inclined plate, and a cam actuated by said rock shaft and adapted to expand the brake shoes.

2. A device constructed in accordance with claim 1 wherein said levers are provided with rollers on their free ends adapted to engage the upper and lower surfaces of said inclined plate.

3. In a device of the character described, a vertically movable member mounted in the spindle bolt of the front wheel of a motor vehicle, a brake drum carried by the wheel, brake shoes arranged in said drum, a disk carried by the spindle and arranged adjacent the open side of said drum, a curved plate mounted on the upper end of said movable member and arranged adjacent said brake drum, a lever pivotally mounted on the axle and engaging the lower surface of said plate, a rock shaft rotatably mounted in said disk and projecting laterally, a lever carried by said rock shaft and engaging the upper surface of said curved plate, and a cam mounted on said rock shaft within said brake drum.

In testimony whereof, I affix my signature.

EDWARD FRANK REMUS.